United States Patent Office 3,534,057
Patented Oct. 13, 1970

3,534,057
HALOGENATION PROCESS FOR THE PRODUCTION OF CERTAIN OXADIAZOLIDINES AND THIADIAZOLIDINES
John Krenzer, Oak Park, Ill., assignor to Velsicol Chemical Corporation, Chicago, Ill., a corporation of Delaware
No Drawing. Filed May 28, 1968, Ser. No. 732,532
Int. Cl. C07d 85/34, 91/16
U.S. Cl. 260—306.7
8 Claims

ABSTRACT OF THE DISCLOSURE

This invention discloses a process for selectively halogenating oxadiazolidines and thiadiazolidines of the formula

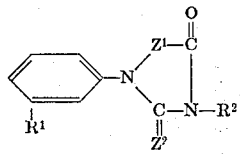

wherein $R^1$ is selected from the group consisting of hydrogen, alkyl, alkoxy and halogen, $R^2$ is alkyl, and $Z^1$ and $Z^2$ are independently selected from the group consisting of oxygen and sulfur, in the 4-position of the phenyl ring which comprises reacting said compounds with a halogen in the presence of base at a temperature up to about 60° C.

This invention relates to a new process for the production of certain heterocyclic compounds, and more particularly relates to the production of para halogenated 2-aryl-1,2,4-oxadiazolidines and 2-aryl-1,2,4-thiadiazolidines of the formula

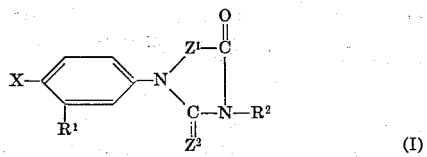

wherein X is halogen, $R^1$ is selected from the group consisting of hydrogen, alkyl, alkoxy and halogen, $R^2$ is alkyl, and $Z^1$ and $Z^2$ are independently selected from the group consisting of oxygen and sulfur.

The compounds of the above description are valuable chemicals which are particularly useful as herbicides. Heretofore these compounds were prepared from simple starting materials which contain those substituents on the benzene ring that are desired in the final product. Thus, for example, in preparing the compounds of Formula I wherein $Z^1$ is sulfur, as is described by G. Zumach et al. in South African Pat. 67/1970, the starting materials are substituted N-phenyl ureas having as substituents on the benzene ring the same substitutents desired in the final product. Similar requirements for preparing the compounds of Formula I wherein $Z^1$ is oxygen, are reported in the art. To prepare these starting material phenyl ureas, having a halogen in the para position, presents a variety of problems particularly on a commercial scale. Generally, these phenyl ureas are prepared from a nitrobenzene in a two step process which comprises reducing the nitro group to the hydroxylamine and then reacting the hydroxylamine with an isocyanate or carbamoyl halide. However, some para-halonitrobenzenes cannot be successfully nitrated in the para position. Additional problems arise in the reduction of the para-halonitrobenzenes to the hydroxylamines wherein dehalogenation of the halo group often takes place.

It has now been discovered that the 2-phenyl-1,2,4-oxadiazolidines and 2-phenyl-1,2,4-thiadiazolidines of Formula I, having a halogen substitutent, that is, a fluorine, chlorine, bromine or iodine substituent, in the para position on the phenyl ring and optionally having an alkyl, alkoxy or halogen substituent in the meta position of said ring, can be readily prepared in substantially stoichiometric yields by reacting a 2-phenyl-1,2,4-oxadiazolidine or thiadiazolidine of the formula

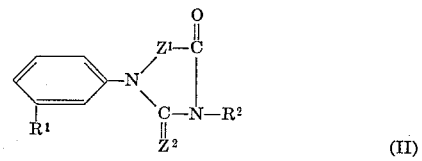

where $R^1$, $R^2$, $Z^1$ and $Z^2$ are as hereinabove described, with a halogen. In utilizing the process of this invention many of the difficulties of preparing the valuable compounds of Formula I are overcome. Unexpectedly, it was found that direct halogenation of the compounds of Formula II in accordance with this process, always results in a single substitution of the halogen onto the para position of the phenyl ring. Moreover, it was found that this reaction takes place under unusually mild reaction conditions and results in a product of high purity in a substantially quantitative yield.

The process of this invention comprises selectively halogenating oxadiazolidines or thiadiazolidines, having the structure of Formula II, in the 4-position of the phenyl ring by reacting said compounds with a halogen in the presence of base at a temperature of up to about 60° C. While temperatures up to about 60° C. can be utilized for the process of this invention a preferred temperature range is from about 10° C. to about 45° C. Temperatures above the described limits are not suitable since they result in undesirable side reactions and poor yields.

This process is conveniently carried out in an inert organic reaction medium which can comprise an inert organic solvent such as, for example, carbon tetrachloride, chloroform, benzene, toluene, nitrobenzene, xylene, glacial acetic acid and the like.

The presence of base is required in this reaction process to react with the hydrogen halide which is formed during the reaction. Suitable basic materials for the process of this invention are, for example, tertiary amines such as pyridine or triethylamine, alkali metal hydroxides such as sodium hydroxide or potassium hydroxide, and basic salts such as sodium acetate, sodium carbonate, sodium bicarbonate and the like. These basic materials are preferably present in the reaction medium in about an equimolar amount in relation to the starting material.

A particularly preferred embodiment of the present invention comprises reacting a 2-phenyl-1,2,4-oxadiazolidine or thiadiazolidine of Formula II with an equimolar or slight excess molar amount of chlorine or bromine in a reaction medium which consists of glacial acetic acid in the presence of an alkali metal acetate at a temperature of about 10 to about 40° C. This reaction procedure results in substantially stoichiometric yields of product and allows for a simple and expedient recovery of this product.

Examplary of the starting materials which can be used in the process of this invention are 2-phenyl-4-methyl-1,2,4-oxadiazolidine-3,5-dione,
2-(3'-methylphenyl)-4-methyl-1,2,4-oxadiazolidine-3,5-dione,
2-(3'-chlorophenyl)-4-methyl-1,2,4-oxadiazolidine-3,5-dione,
2-(3'-methoxyphenyl)-4-methyl-1,2,4-oxadiazolidine-3,5-dione, 2-(3'-bromophenyl)-4-methyl-1,2,4-oxadiazolidine-3,5-dione,
2-phenyl-4-methyl-1,2,4-thiadiazolidine-3,5-dione,
2-(3'-methylphenyl)-4-methyl-1,2,4-thiadiazolidine-3,5-dione,
2-phenyl-4-methyl-5-oxo-3-thio-1,2,4-oxadiazolidine,
2-(3'-ethylphenyl)-4-methyl-5-oxo-3-thio-1,2,4-thiadiazolidine,
2-(3'-methoxyphenyl)-4-methyl-1,2,4-thiadiazolidine-3,5-dione and the like.

In carrying out the process of this invention, which is preferably effected in a batch-type operation, the oxadiazolidine or thiadiazolidine starting material, the inert reaction medium, and the basic material are all charged into a suitable reaction vessel equipped with temperature controlling and stirring means. The mixture is then stirred and the halogen is added thereto. The temperature of the reaction can be maintained between 10 to about 60° C. during the addition of halogen. Stirring of the reaction mixture is preferably continued until a stoichiometric amount of the halogen has reacted. After this time the desired product can be recovered by filtration if a reaction medium wherein the product is insoluble is chosen or can be recovered by evaporation of the solvent if the product is soluble therein. The product can then be used as such or can be further purified by washing, recrystallization and the like.

When the process of this invention is carried out in a glacial acetic acid in the presence of an alkali metal acetate, the product is readily recovered upon the addition of water and filtration of the reaction mixture.

The following examples are presented to further illustrate the process of this invention.

EXAMPLE 1

Preparation of 2-(4'-chlorophenyl)-4-methyl-1,2,4-oxadiazolidine-3,5-dione

A slurry of 2-phenyl-4-methyl-1,2,4-oxadiazolidine-3,5-dione (19.2 grams) and sodium acetate (8.6 grams) in glacial acetic acid (80 ml.) is charged into a glass reaction vessel equipped with a mechanical stirrer. Chlorine gas (7.3 grams) is added to the reaction mixture over a period of about 15 minutes with vigorous stirring and maintaining the reaction mixture at about 35° C. After the addition is completed the mixture is stirred for a period of about 2 hours. After this time water (200 ml.) is added to the reaction mixture. The reaction mixture is then filtered to recover the desired product 2-(4'-chlorophenyl)-4-methyl-1,2,4-oxadiazolidine-3,5-dione.

EXAMPLE 2

Preparation of 2-(3'-methyl-4'-bromophenyl)-4-methyl-1,2,4-oxadiazolidine-3,5-dione A slurry of 2-(3'-methylphenyl)-4-methyl-1,2,4-oxadiazolidine-3,5-dione (6.2 grams) and sodium acetate (2.6 grams) in glacial acetic acid (31 ml.) was charged into a glass reaction flask equipped with a mechanical stirrer. Bromine (5.0 grams) was then added over a period of about 15 minutes while maintaining the reaction temperature at about 30° C. The reaction mixture was stirred for an additional period of 90 minutes at 30° C. and 45 minutes at 40° C. After this time water (77.5 ml.) was added and the reaction product recovered by filtration. The product was then washed and dried to yield 2-(3'-methyl-4'-bromophenyl)-4-methyl-1,2,4-oxadiazolidine-3,5-dione (8.0 grams; 94% of theoretical yield).

EXAMPLE 3

Preparation of 2-(3'-methyl-4'-chlorophenyl)-4-methyl-1,2,4-oxadiazolidine-3,5-dione A slurry of 2-(3'-methylphenyl)-4-methyl-1,2,4-oxadiazolidine (22.7 grams) and sodium acetate (10.0 grams) in glacial acetic acid (110 ml.) was charged into a glass reaction flask equipped with a mechanical stirrer. Chlorine (8.2 grams) was then added over a period of 15 minutes while maintaining the reaction temperature below about 35° C. Stirring was continued for about 90 minutes followed by the addition of 275 ml. of water. The reaction product was then recovered by filtration, was washed, and dried to yield 25.2 grams (95% theoretical yield) of 2-(3'-methyl-4'-chlorophenyl)-4-methyl-1,2,4-oxadiazolidine-3,5-dione.

EXAMPLE 4

Preparation of 2-(4-chlorophenyl)-4-methyl-1,2,4-thiadiazolidine-3,5-dione

A solution of 2-phenyl-4-methyl-1,2,4-thiadiazolidine-3,5-dione (20.8 grams; 0.1 mol) in toluene (200 ml.) and pyridine (8 grams; 0.1 mol) are charged into a reaction vessel equipped with a mechanical stirrer. Chlorine (7.7 grams; 0.11 mol) is then slowly added with stirring over a period of 20 minutes while maintaining the reaction temperature at about 45° C. After the addition is completed stirring is continued for about 1 hour. After this time the reaction product is recovered by filtration, is washed with water, and dried to yield 2-(4-chlorophenyl)-4-methyl-1,2,4-thiadiazolidine-3,5-dione.

EXAMPLE 5

Preparation of 2-(3'-bromo-4-chlorophenyl)-4-methyl-1,2,4-oxadiazolidine-3,5-dione A solution of 2 - (3' - bromophenyl) - 4-methyl-1,2,4-oxadiazolidine-3,5-dione (27.1 grams; 0.1 mol) in carbon tetrachloride (100 ml.), and pyridine (8.0 grams; 0.1 mol) are charged into a glass reaction vessel equipped with mechanical stirring means. Chlorine (7.7 grams; 0.11 mol) is then slowly added with stirring over a period of about 20 minutes while maintaining the reaction temperature between about 20 to 40° C. After the addition is completed stirring is continued for about 1 hour. After this time the reaction mixture is stripped of solvent under reduced pressure leaving a solid product. The product is then washed with water and dried to yield 2-(3'-bromo-4' - chlorophenyl) - 4 - methyl-1,2,4-oxadiazolidine-3,5-dione.

EXAMPLE 6

Preparation of 2-(3'-methoxy-4'-bromophenyl)-4-ethyl-1,2,4-thiadiazolidine-3,5-dione A slurry of 2 - (3' - methoxyphenyl) - 4-ethyl-1,2,4-thiadiazolidine-3,5-dione (25.2 grams; 0.1 mol) and sodium acetate (9.3 grams; 0.11 mol) in glacial acetic acid (100 ml.) is charged into a glass reaction flask equipped with a mechanical stirrer. Bromine (8.8 grams; 0.11 mol) is then added over a period of about 20 minutes while maintaining the reaction temperature between about 10 and 30° C. The reaction mixture is then stirred for a period of about 2 hours. After this time water (100 ml.) is added to the reaction mixture and the reaction product is recovered by filtration. The product is then washed and dried to yield 2 - (3' - methoxy - 4-bromophenyl)-4-ethyl-1,2,4-thiadiazolidine-3,5-dione.

EXAMPLE 7

Preparation of 2-(4'-bromophenyl)-4-methyl-1,2,4-oxadiazolidine-3,5-dione

A slurry of 2 - phenyl - 4 - methyl-1,2,4-oxadiazolidine-3,5-dione (19.2 grams; 0.1 mol) and sodium acetate (9.0 grams) in glacial acetic acid (100 ml.) is charged into a glass reaction flask equipped with a mechanical stirrer. Bromine (8.8 grams; 0.11 mol) is then added over a period of about 30 minutes while maintaining the temperature at about 35° C. After the addition is completed the reaction mixture is stirred for a period of about 2 hours. After this time water (100 ml.) is added to the reaction mixture and the reaction product is recovered by filtration and is washed with water and dried to yield 2-(4'-bromophenyl)-4-methyl-1,2,4-oxadiazolidine-3,5-dione.

I claim:

1. A process for selectively halogenating oxadiazolidines and thiadiazolidines of the formula

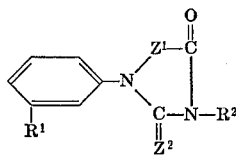

wherein $R^1$ is selected from the group consisting of hydrogen, methyl, ethyl, methoxy, and halogen, $R^2$ is methyl, ethyl, and $Z^1$ and $Z^2$ are independently selected from the group consisting of oxygen and sulfur in the 4-position of the phenyl ring which comprises reactiong said compounds with chlorine or bromine in the presence of base at a temperature up to about 60° C.

2. The process of claim 1, wherein the halogenation is carried out at a temperature of from about 10 to about 45° C.

3. The process of claim 1 wherein the halogen is chlorine.

4. The process of claim 1, wherein the halogen is bromine.

5. The process of claim 1, wherein the base is selected from the group consisting of tertiary amines, alkali metal hydroxides, alkali metal carbonates, alkali metal bicarbonates, and alkali metal acetates.

6. The process of claim 1, wherein a described oxadiazolidine or thiadiazolidine is reacted with a halogen in a reaction medium of acetic acid in the presence of an alkali metal acetate at a temperature of about 10 to about 40° C.

7. The process of claim 5 wherein the halogen is chlorine.

8. The process of claim 5 wherein the halogen is bromine.

References Cited

Cason, Essential Principles of Organic Chemistry, Prentice-Hall, 1956, pp. 311–2.

Wagner et al., Synthetic Organic Chemistry, John Wiley, 1953, pp. 98–9.

Weygand, Organic Preparations, Interscience, 1945, pp. 76–8, 86–8, 93.

ALEX MAZEL, Primary Examiner

R. J. GALLAGHER, Assistant Examiner

U.S. Cl. X.R.

260—307